March 18, 1941.   A. WERME   2,235,781
SCREW DRIVER
Filed May 13, 1938
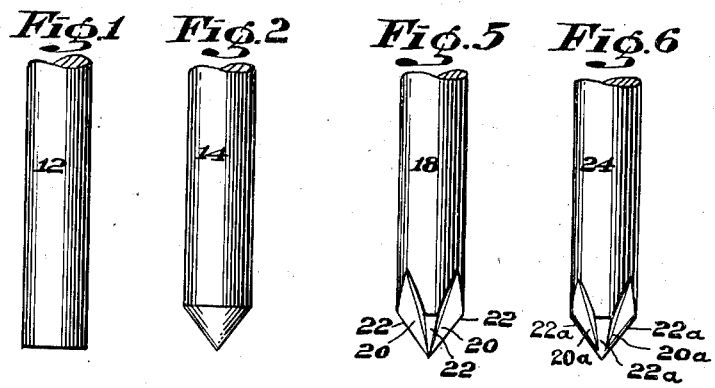
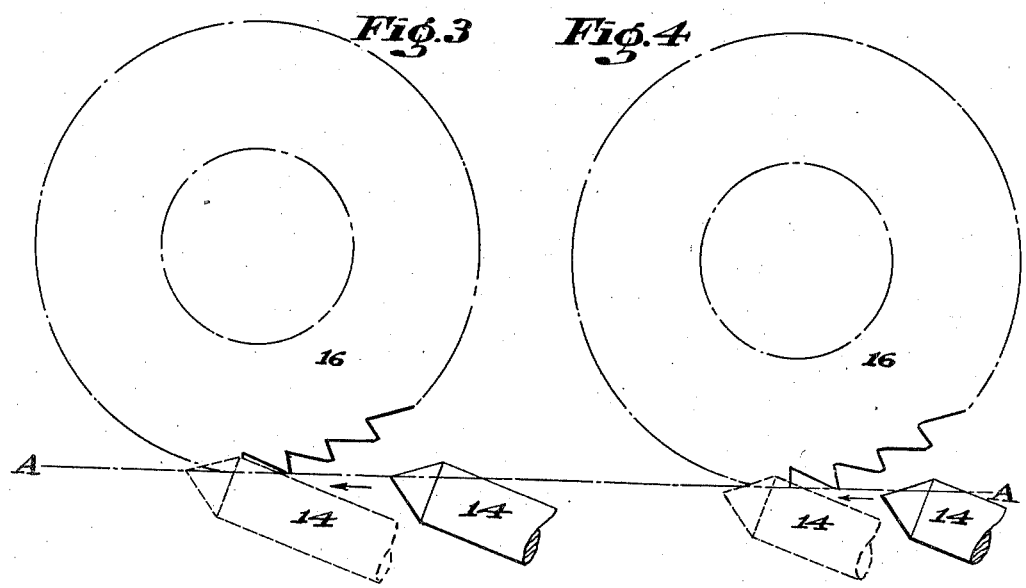
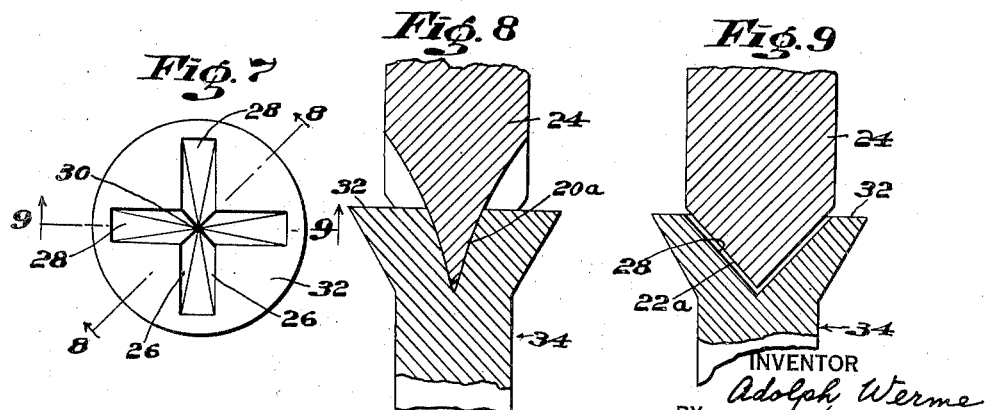
INVENTOR
Adolph Werme
BY C. E. Hammett Jr.
ATTORNEY Patented Mar. 18, 1941

2,235,781

UNITED STATES PATENT OFFICE 2,235,781

SCREW DRIVER

Adolph Werme, Worcester, Mass., assignor to Reed & Prince Manufacturing Company, Worcester, Mass., a corporation of Massachusetts Application May 13, 1938, Serial No. 207,793

2 Claims. (Cl. 145—50)

The present invention relates to means for effecting wedging engagement between a screw and a driver and has for its object the provision of improved means of this nature.

The snug engagement effected by the invention greatly facilitates the driving of the screw, particularly in locations to which access is difficult, since the screw will be temporarily held on the driver by this wedging action and need not be guided or steadied by the hand of the operator.

The invention may be advantageously applied, for example, to screws of the type shown in United States Patents Nos. 145,411 and 308,246, and to drivers of the type shown in Patents Nos. 179,695 and 308,247, although its application is by no means limited thereto. This type of screw presents a recess in the head of the screw, which recess terminates laterally within the head and does not extend to the circumference of the head in any direction. The recess may comprise a plurality of arms or grooves, separated from each other by what may be described as intervening ribs. The bit end of the driver for such a screw will present a plurality of ribs, separated by intervening grooves, said ribs being adapted to be received in the arms of the recess for driving the screw. Various specific forms of recess may be adopted, one which has proved advantageous being generally cruciform in outline in a plane at right angles to the longitudinal axis of the screw, the walls of the recess tapering to or toward a common point at the bottom of the recess and on the longitudinal axis of the screw.

Recesses of the type mentioned above may conveniently be formed in the heads of screws by a punching operation. A suitable punch for this purpose may be manufactured from a metal blank by forming a cone point on said blank and then cutting grooves in the punch by means of a milling cutter. The driver for the screw may be similarly made.

In accordance with the present invention, there is provided a novel driver by means of which there is obtained effective wedging action between said driver and screws driven thereby.

The head or bit ends of both the driver and the punch for forming the recess in the head of the screw may be formed in the manner above indicated, that is, by advancing a metal blank into contact with a milling cutter. The desired wedging action may be obtained by varying the positions of the blanks relative to the cutter as hereinafter set forth.

For a better understanding of the invention, reference may be had to the accompanying drawing, in which, Fig. 1 is an elevational view, partly broken away, of a cylindrical metal blank from which either the bit or the driver may be formed;

Fig. 2 is a similar view showing the blank of Fig. 1 with a cone point formed thereon;

Fig. 3 is a diagrammatic elevational view illustrating the step of cutting the grooves in the head of the punch;

Fig. 4 is a similar view illustrating the cutting of the grooves in the bit end of the driver;

Fig. 5 is an elevation, partly broken away, of the finished punch;

Fig. 6 is a similar view of the finished driver;

Fig. 7 is a plan view of the head of a screw showing the cruciform recess formed therein by the punch of Fig. 5;

Fig. 8 is a fragmentary sectional elevation illustrating the wedging engagement between the driver and the screw recess, the view being taken on the line 8—8 of Fig. 7;

Fig. 9 is a view similar to Fig. 8 but taken on the line 9—9 of Fig. 7.

Referring to the drawing, a cylindrical blank of metal 12, fragmentarily shown in Fig. 1, may have a cone point formed on one end thereof, conveniently by a turning or grinding operation. The pointed blank is fragmentarily illustrated in Figs. 2, 3 and 4 and is indicated by the numeral 14.

The blanks for both the punch and the driver are preferably of the same general shape, although they may be of different shapes, diameters and lengths. The angle of the cone point is advantageously substantially the same on both punch and driver, as will hereinafter appear, a convenient included angle of the cone point being for example 75°.

Fig. 3 shows diagrammatically the cutting of grooves in the pointed blank 14 of Fig. 2, the blank being advanced in the direction of the arrow toward the milling cutter 16. This milling cutter is of a type known in the art, comprising a rotating cutting wheel having teeth thereon, the teeth being formed appropriately to cut a groove of the desired shape in the blank 14. The blank 14 is advanced to the cutter along a line tangent to the circumference of the cutter, the longitudinal axis of the blank, however, being inclined from said tangent as illustrated. The broken line A—A of Figs. 3 and 4 is a common tangent to the circumferences of the cutters 16 shown in both figures and the blanks 14 are advanced to the cutters along this line while held, as stated, with their axes inclined with relation thereto, for example at an angle of 9° or other convenient angle.

It will be noted that when making the punch, as illustrated in Fig. 3, the blank is preferably, although not necessarily, so held and so advanced with relation to the cutter that the cutter will come in contact with the blank at the point of the cone. The groove made by the cutter will in this case extend clear to the point of the punch.

The blank 14 having been advanced to the position shown in dashed lines in Fig. 3, at which point the cutter has formed a groove therein, as indicated, the blank is withdrawn from the cutter and rotated on its own axis through an angle of 90°. It is then again advanced to the cutter and this operation is repeated until four tapering grooves, in pairs diametrically opposite each other, have been formed on the head of the punch.

The metal of the punch is then hardened in the conventional manner, by heat treatment and quenching. The punch may further be polished if desired.

Fig. 5 illustrates the finished punch, the punch being denoted by the numeral 18, the grooves by the numeral 20 and the intervening ribs by the numeral 22.

In making a driver, as illustrated in Fig. 4, there is used a driver blank 14 with a cone point advantageously having an included angle the same as or approximating that of the cone point on the punch blank 14 of Fig. 3. This driver blank may or may not be, in its shank portion, of the same diameter and shape as the blank from which the punch was made.

The blank 14 from which the driver is to be made is advanced along a tangent A—A to the circumference of the milling cutter 16, as illustrated in Fig. 4, the longitudinal axis of the blank being preferably held at an angle to said tangent exactly the same as the angle thereto at which the punch blank 14 of Fig. 3 was held.

However, while the relative angular positions of the blanks with reference to the cutter are preferably the same when making either a punch or a driver, the spacing of the blank from the cutter is greater when making a driver than when making a punch. This is clearly shown in Fig. 4, where it will be noted that the point of the cone-shaped part of the blank is below the line A—A tangent to the circumference of the cutter. The blank may, for example, conveniently be held 0.002 inch farther from the cutter when making a driver than when making a punch, this distance being exaggerated in the drawing for clearness of illustration. Thus the cutter will come in contact with the driver blank above the point of the cone and the groove made by the cutter will not extend to the point of the driver.

The driver blank having been advanced to approximately the position shown in dashed lines in Fig. 4, at which point the cutter has formed a groove therein, the blank is withdrawn from the cutter and rotated on its own axis through an angle of 90°. This operation is repeated, as in the cutting of the punch, until four tapering grooves in pairs diametrically opposite each other have been formed in the bit end of the driver.

The metal of the driver is then hardened and the driver may be polished if desired.

Fig. 6 illustrates the finished driver, the driver being denoted by the numeral 24, the grooves by the numeral 20a and the intervening ribs by the numeral 22a.

The punch 18 may be used to form recesses in the heads of screws, bolts, etc., of any type and of any style of head. This procedure is accomplished in automatic machinery, is known in the art and requires no description herein. The result of this punching operation is the formation of a recess in the head 32 of the screw, this recess corresponding exactly to the shape of the punch used.

The form of punch 18 illustrated in the accompanying drawing and comprising four ribs and four grooves spaced at 90° angles will form the cruciform recess shown in plan view in Fig. 7. In the specific recess shown, the side walls 26 of any given arm of the recess, which side walls are made by the sides of the ribs 22 on the punch, will be parallel in planes at right angles to the longitudinal axis of the screw. These side walls, as also the bottom walls 28 of the arms, converge to the common point 30 which is located on the longitudinal axis of the screw.

It will be obvious, of course, that my invention is equally applicable to other types of recess, regardless of the angular relations of the walls relative to each other and regardless of the specific shape of the recess.

It will be noted that the finished punch 18 and the finished driver 24 both comprise shank portions, which may or may not be of the same shape and diameter, and head or bit ends presenting alternate grooves 20 and 20a and ribs 22 and 22a, the ribs presenting outer surfaces which converge at the same angle in both cases to a common point at the end of the tool. The grooves also converge at the same angle in both punch and driver, but their meeting points differ. In the case of the punch 18, in the form shown, the grooves extend clear to the point of the tool, which is the common meeting point of both the grooves and the outer surfaces of the ribs, whereas in the case of the driver the grooves do not extend to the point of the tool but converge toward a common point beyond the end thereof.

When the driver 24 is used to drive screws having recesses made by the punch 18, it will be seen that the bit end of the driver is unable to enter the recess clear to the bottom thereof because the diameter of the driver measured between the bottoms of opposite grooves 20a, in any given transverse plane at right angles to the longitudinal axis of the driver, will be greater than the corresponding diameter of the punch taken in a transverse plane located the same distance from the head or pointed end of the tool, which dimension of the punch determines the distance between oppositely-disposed ribs of the screw recess.

This is clearly shown in Figs. 8 and 9. Fig. 8 is a fragmentary sectional elevation taken through diametrically opposite grooves of the driver and diametrically opposite ribs of the screw recess, showing the driver 24 applied to a recess in the head 32 of the screw 34. It will be noted that, due to the greater diameter between the bottoms of opposite grooves of the driver, as compared with the punch, the point of the driver is spaced from the bottom of the recess in the screw when the grooves 20a of the driver are in snug engagement with the corresponding ribs of the screw recess.

Fig. 9 is a view similar to Fig. 8 but taken through the ribs 22a of the driver and the corresponding grooves or arms of the screw recess. It will be noted that the surfaces of the ribs 22a are at all points spaced from the corresponding surfaces 28 of the screw recess. This again is due to the greater diameter between the bottoms of the grooves of the driver, as compared to the punch.

Therefore, when the driver 24 is advanced into the recess made by the punch 18, engagement between said driver and said recess will be primarily along the ribs of the recess and the corresponding grooves of the driver. There will be no substantial contact between the ribs of the driver and the bottoms of the grooves of the screw recess. Thus snug and firm wedging engagement between the screw and the driver is effected.

Since, as pointed out above, the point of the driver is ordinarily spaced from the bottom of the recess in the screw when the driver is in position in said recess, it will be seen that the end of the driver may be truncated or may be of any convenient shape so long as it does not interfere with snug engagement of the driver in the screw recess.

It has been stated above that the angles of the cone points on the blanks for both the punch and the driver are advantageously substantially the same. These angles determine the included angles between the outer surfaces of diametrically opposed ribs of the respective tools. If the included angles between these outer surfaces on punch and driver are the same or substantially the same, these surfaces on the driver will be uniformly or substantially uniformly spaced a slight distance from the bottoms of the grooves in the screw, as shown in Fig. 9, when the driver is in position in the screw recess. However, these angles on the punch and driver need not be the same. The included angle on the driver may be greater than that on the punch, so long as it is not so great that the outer surfaces of the ribs of the driver come in contact with the bottom walls of the grooves of the screw recess before the driver is properly seated in that recess. Conversely, the included angle on the driver may be less than that on the punch. The result of decreasing the angle on the driver will be to shorten the radial dimension of the sides of the ribs 22a of the driver, which present surfaces bearing against the sides 26 of the grooves in the screw, for driving the screw. Thus the included angle on the driver may be less than that on the punch so long as it is not so small as to prevent proper driving of the screw.

Having thus described my invention, I claim:

1. A screw driver for use with a screw having a recess extending into its upper face along its longitudinal axis, walls of said recess comprising alternate ribs and grooves converging to a common point, said driver having a bit end presenting alternate downwardly converging grooves and ribs adapted to be received in the ribs and grooves respectively of the screw recess, ribs of said screw recess and grooves of said bit end on the driving tool being inclined at the same angle from the longitudinal axes of the screw and bit respectively, the diameter of the driver in the zone of the bit end, measured between the bottoms of the grooves in any transverse plane at right angles to the longitudinal axis of the driver, being greater than the diameter of the screw recess measured between the edges of the ribs in a similar transverse plane located the same distance from said common point in the recess as the distance from the tip of the bit end to the said first-mentioned transverse plane so that, when the driver bit is rectilinearly advanced into the screw recess, engagement of ribs of the recess with grooves of the driver bit along a substantial part of the length of said ribs will prevent any substantial engagement of the outer edge surfaces of the ribs of the driver bit with the bottom of the grooves of the screw recess and of the tip of the driver bit with the said common point in the screw recess.

2. A screw driver for use with a screw having a recess extending into its upper face along its longitudinal axis, walls of said recess comprising converging alternate ribs and grooves, said driver having a bit end presenting alternate downwardly converging grooves and ribs adapted to be received in the ribs and grooves respectively of the screw recess, ribs of said screw recess and grooves of said bit end on the driving tool being inclined at the same angle from the longitudinal axes of the screw and bit respectively, the diameter of the driver in the zone of the bit end, measured between the bottoms of the grooves in any transverse plane at right angles to the longitudinal axis of the driver, being greater than the diameter of the screw recess measured between the edges of the ribs in a similar transverse plane located the same distance from the bottom of the screw recess as the distance from the tip of the bit end to the said first-mentioned transverse plane so that, when the driver bit is rectilinearly advanced into the screw recess, wedging engagement between ribs of the recess and grooves of the driver bit, sufficient to hold the screw temporarily on the driver, will occur before engagement of the outer edge surfaces of ribs or the tip of the driver bit with the screw recess prevents further movement of the driver bit into the recess.

ADOLPH WERME.